US012489317B2

United States Patent
Agafonov (10) Patent No.: US 12,489,317 B2
(45) Date of Patent: Dec. 2, 2025

(54) WIRELESS POWER TRANSFER (71) Applicant: KONINKLIJKE PHILIPS N.V., Eindhoven (NL)

(72) Inventor: Aleksei Agafonov, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 13 days.

(21) Appl. No.: 18/279,407

(22) PCT Filed: Feb. 28, 2022

(86) PCT No.: PCT/EP2022/054995
§ 371 (c)(1),
(2) Date: Aug. 30, 2023

(87) PCT Pub. No.: WO2022/184644
PCT Pub. Date: Sep. 9, 2022

(65) Prior Publication Data
US 2024/0204569 A1 Jun. 20, 2024

(30) Foreign Application Priority Data
Mar. 4, 2021 (EP) ..................................... 21160630

(51) Int. Cl.
*H02J 50/12* (2016.01)
*H02J 50/80* (2016.01)
*H02J 50/90* (2016.01)

(52) U.S. Cl.
CPC .............. *H02J 50/12* (2016.02); *H02J 50/80* (2016.02); *H02J 50/90* (2016.02)

(58) Field of Classification Search
None
See application file for complete search history.

(56) References Cited

U.S. PATENT DOCUMENTS

2019/0121401 A1* 4/2019 Tsukamoto ............... G06F 1/26
2019/0393731 A1* 12/2019 Maniktala ............... H02J 50/20
2019/0393735 A1* 12/2019 Lee .......................... H02J 50/80

FOREIGN PATENT DOCUMENTS

EP          2985853 A1   2/2016
KR       101689495 B1   12/2016

OTHER PUBLICATIONS

International Search Report and Written Opinion from WO2022/184644 mailed Jun. 14, 2022.
QI Specification.

* cited by examiner

*Primary Examiner* — Daniel Kessie (57) ABSTRACT

A power transmitter (101) transfers power to a power receiver (105) and comprises a power input (209) receiving supply power. A power detector (211) detects a restoring of the supply power following an outage, and a presence detector (213) detects the presence of the power receiver when supply power is being restored. A first communicator (207) can communicate with a second communicator (509) of the power receiver (105) using a short range communication channel. A message circuit (215) transmits a power restore message to the second communicator (509) when supply power is being restored. A user action detector (217) detects a power receiver user action and a controller (205) arranged to initiate a power transfer to the power receiver after power restoration in response to the detection of the user action and to inhibit initiation of the power transfer after power restoration if the user action is not detected. The power receiver (105) can generate a user alert when receiving the power restore message.

11 Claims, 6 Drawing Sheets

WIRELESS POWER TRANSFER

CROSS-REFERENCE TO PRIOR APPLICATIONS

This application is the U.S. National Phase application under 35 U.S.C. § 371 of International Application No. PCT/EP2022/054995, filed on Feb. 28, 2022, which claims the benefit of EP Patent Application No. EP 21160630.6, filed on Mar. 4, 2021. These applications are hereby incorporated by reference herein.

FIELD OF THE INVENTION

The invention relates to a wireless power transfer system and in particular, but not exclusively, to the operation of a power transmitter providing inductive power transfer to high power devices, such as e.g. kitchen appliances.

BACKGROUND OF THE INVENTION

Most present-day electrical products require a dedicated electrical contact in order to be powered from an external power supply. However, this tends to be impractical and requires the user to physically insert connectors or otherwise establish a physical electrical contact. Typically, power requirements also differ significantly, and currently most devices are provided with their own dedicated power supply resulting in a typical user having a large number of different power supplies with each power supply being dedicated to a specific device. Although, the use of internal batteries may avoid the need for a wired connection to a power supply during use, this only provides a partial solution as the batteries will need recharging (or replacing). The use of batteries may also add substantially to the weight and potentially cost and size of the devices.

In order to provide a significantly improved user experience, it has been proposed to use a wireless power supply wherein power is inductively transferred from a transmitter inductor in a power transmitter device to a receiver coil in the individual devices.

Power transmission via magnetic induction is a well-known concept, mostly applied in transformers having a tight coupling between a primary transmitter inductor/coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to, or on top of, the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer approach, known as the Qi Specifications, has been defined and is currently being further developed. This approach allows power transmitter devices that meet the Qi Specifications to be used with power receiver devices that also meet the Qi Specifications without these having to be from the same manufacturer or having to be dedicated to each other. The Qi standard further includes some functionality for allowing the operation to be adapted to the specific power receiver device (e.g. dependent on the specific power drain).

The Qi Specification is developed by the Wireless Power Consortium and more information can e.g. be found on their website: http://www.wirelesspowerconsortium.com/index.html, where in particular the defined Specification documents can be found.

The Wireless Power Consortium has on the basis of the Qi Specification proceeded to develop the Ki Specification (also known as the Cordless Kitchen Specification) which is aimed at providing safe, reliable, and efficient wireless power transfer to kitchen appliances. Ki supports much higher power levels up to 2.2KW.

In many wireless power transfer systems, such as specifically for Ki systems, it is intended for the power transmitter to continually be able to power a power receiver and power transfer is arranged to begin and take place simply when a power receiver is positioned appropriately with respect to the power transmitter.

In order to achieve such operation, the power transmitter is typically configured to be provided with continuous power such that it is effectively continually switched on and ready for power transfer.

However, an issue for such approaches is that a continuous power supply cannot be guaranteed at all times. In particular, powering e.g. a Ki kitchen power transmitter from the mains may be subject to occasional power outages or disruption. Indeed, in some areas, such power outages may be relatively commonplace.

Accordingly, a particular challenge for power transfer implementation and operation is how to handle power supply interruptions and specifically how to safely and reliably operate following the restoration of power supply following a disruption/outage. However, current approaches tend to be suboptimal and tend to not in all situations provide optimal performance. For example, risk of undesirable power transfers may often not be reduced as much as would be desirable.

Hence, an improved operation for a power transfer system would be advantageous and, in particular, an approach allowing increased flexibility, reduced cost, reduced complexity, improved power supply outage/disruption handling, increased reliability and/or safety protection, improved initialization of power transfer, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided wireless power transfer system comprising a power transmitter and a power receiver, the power transmitter being arranged to transfer power to a power receiver via an inductive power transfer signal; the power transmitter comprising: a power input arranged to receive supply power from an external power supply; a power detector arranged to detect a restoring of the supply power following an outage of the supply power; a presence detector arranged to detect a presence of the power receiver at restoring of the supply power; a first communicator arranged to set up a short range communication channel to a second communicator using a short range communication system; a message circuit arranged to transmit a power restore message to the second communicator over the short range communication channel in response to detecting the restoring of the supply power, the short range communication channel having a range not exceeding 3 meters; a user action detector arranged to detect a power receiver user action; a controller arranged to initiate a power transfer to the power receiver after power restoration in response to the detection of the user action and to inhibit initiation of the power transfer after power restoration if the user action is not detected; and the power receiver comprises: the second communicator arranged to communicate with the first communicator over the short range communication channel; and a user interface arranged to generate a user alert in response to the second communicator receiving the power restore message.

The invention may provide improved performance and/or operation in many scenarios and applications. The approach may in many embodiments provide improved performance and/or operation when a power transmitter experiences outages/disruptions of the supply power. In many embodiments, it may provide a more reliable operation and may reduce the risk of undesirable power transfers following a power outage. The approach may in particular provide improved operation for many systems where the power transmitter is arranged to be continuously powered, such as power transmitter being arranged to be continuously connected to a mains supply. The approach may provide advantageous operation for e.g. kitchen appliances where power receiving devices may often be positioned at power transfer positions for extended periods including at times where no power transfer is required or desired.

The supply power may in particular provide power for the power transfer signal. The power transmitter may comprise a driver arranged to generate a drive signal for a transmitter coil to generate the power transfer signal. The driver may be powered by the supply power, and the power transfer signal may be generated from the supply power. In many embodiments, the supply power may power all functionality of the power transmitter. The external power supply may specifically be a mains power supply.

The outage/disruptions of the supply power may be a complete absence of any supply power for a duration of the outage/disruption or may in some embodiments e.g. be a partial outage/disruption during which only a reduced power is provided. The detection of the restoring of the supply power following an outage of the supply power may be a detection of the supply power having a power/voltage/current level exceeding a first threshold following a period in which it did not exceed a second threshold where the first threshold is not less than the first threshold. The thresholds may be predetermined thresholds.

The presence detector detecting the presence of the power receiver at restoring of the supply power may be a detection that a power receiver is present when power restoration occurs, e.g. when power is being restored.

The short range communication channel may be a communication channel having a range not exceeding 20 cm, 40 cm, 50 cm or 1 meter. The first communicator is arranged to set up and support communication over the short range communication channel.

The message circuit may be arranged to transmit the power restore message to the second communicator over the short range communication channel in response to detecting the restoring of the supply power and detecting the presence of a power receiver.

The power receiver user action may be a user action applied to the power receiver.

The controller may be arranged to perform power transfer to the power receiver after power restoration (only) if the presence detector detects the user action, and to prevent power transfer after power restoration if the presence detector does not detect the user action.

The power restore message may be a message indicating that a power restoration is detected.

According to an optional feature of the invention, the user action detector is arranged to detect the user action by detecting a sequence of an absence of the second communicator followed by a presence of the second communicator.

This may provide a particularly advantageous operation in many scenarios and applications. It may provide a very convenient user action to be performed to start power transfer. The approach may in many embodiments reduce complexity and e.g. may allow implementation without requiring specific detection means or means for transmitting data to the power transmitter to be implemented in the power receiver.

In many embodiments, the user action detector may be arranged to detect the user action by detecting a sequence of the presence of the power receiver at restoring of the supply power followed by an absence of the second communicator followed by a presence of the second communicator.

According to an optional feature of the invention, the user interface is arranged to receive a user input, the second communicator is arranged to transmit a user action message in response to the user input meeting a criterion; and the user action detector is arranged to detect the user action in response to the first communicator receiving the user action message.

This may provide a particularly advantageous operation and user experience in many embodiments. It may for example provide a user friendly approach for controlling power transfer following a power outage.

The user action message may be a message indicating that the user input meets the criterion. The user input may for example be a button press and the criterion may be met by the appropriate button being pressed.

According to an optional feature of the invention, the second communicator is arranged to transmit the user action message without receiving a user input if a duration of power interruption of the power transfer signal prior to receiving the power restore message is less than a threshold.

This may provide improved performance and/or more user friendly operation in many embodiments. It may for example allow the power receiver to control when an explicit user action is required to allow power transfer. It may in particular proceed to allow power transfer to proceed for sufficiently short power interruptions without e.g. requiring a specific user input to be provided.

According to an optional feature of the invention, the presence detector is arranged to detect the presence of the power receiver in response to a detection by the first communicator of a presence of the second communicator.

This may provide improved performance and/or more user friendly operation in many embodiments.

According to an optional feature of the invention, the first communicator is arranged to detect the presence of the second communicator in response to detecting a power extracted from an electromagnetic carrier signal generated by the first communicator exceeding a threshold.

This may provide improved performance and/or more user friendly operation in many embodiments.

According to an optional feature of the invention, the first communicator comprises a first communication coil, the second communicator comprises a second communication coil and the short range communication channel is formed by a coupling between the first communication coil and the second communication coil; the user interface is arranged to receive a user input; and the controller is arranged to initiate a sequence of disconnecting the second communication coil from a load followed by connecting the second communication coil to the load in response to the user input meeting a criterion.

This may provide improved performance and/or operation in many applications. It may for example allow user control of the power receiver to affect the performance of the power transmitter without requiring dedicated transmission of data from the power receiver to the power transmitter. In some implementations, it may provide improved support for different types of power transmitters, e.g. it may allow the power receiver to control power transmitters that detect a user action based on presence detection of power receivers.

According to an optional feature of the invention, the user interface is arranged to generate the user alert message only if a duration of power interruption of the power transfer signal prior to receiving the power restore message is less than a threshold.

This may provide improved performance and/or operation in many embodiments.

According to an optional feature of the invention, the short range communication channel is a Near Field Communication, NFC, channel.

This may provide improved performance and/or operation in many embodiments.

According to an optional feature of the invention, the second communicator is arranged to, at restoring of power and prior to establishment of power transfer using the power transfer signal, extract supply power for the second communicator from an electromagnetic carrier signal generated by the first communicator.

This may provide improved performance and/or operation in many embodiments.

According to an optional feature of the invention, the message circuit is arranged to transmit the power restore message to the second communicator over the short range communication channel only if the presence detector has detected the presence of the power receiver.

This may provide improved performance and/or operation in many embodiments.

According to an aspect of the invention there is provided power transmitter for a wireless power transfer system comprising the power transmitter and a power receiver arranged to receive power from the power transmitter via an inductive power transfer signal; the power transmitter comprising: a power input arranged to receive supply power from an external power supply; a power detector arranged to detect a restoring of the supply power following an outage of the supply power; a presence detector arranged to detect a presence of the power receiver at restoring of the supply power; a first communicator arranged to set up a short range communication channel to the power receiver using a short range communication system, the short range communication channel having a range not exceeding 3 meters; a message circuit arranged to transmit a power restore message to the power receiver over the short range communication channel in response to detecting the restoring of the supply power; a user action detector arranged to detect a power receiver user action; a controller arranged to initiate a power transfer to the power receiver after power restoration in response to the detection of the user action and to inhibit initiation of the power transfer after power restoration if the user action is not detected.

According to an aspect of the invention, the power receiver for a wireless power transfer system comprising a power transmitter arranged to provide power to the power receiver via an inductive power transfer signal; the power receiver comprising: a communicator arranged to communicate with the power transmitter over a short range communication channel, the short range communication channel having a range not exceeding 3 meters; a user interface arranged to generate a user alert in response to the communicator receiving a power restore message from the power transmitter; wherein the user interface is arranged to receive a user input and the communicator is arranged to transmit a user action message to the power transmitter in response to the user input meeting a criterion.

According to an aspect of the invention there is provided method of operation for a wireless power transfer system comprising a power transmitter and a power receiver, the power transmitter being arranged to transfer power to the power receiver via an inductive power transfer signal; the method comprising: the power transmitter performing the steps of: receiving supply power from an external power supply; detecting a restoring of the supply power following an outage of the supply power; detecting a presence of the power receiver at restoring of the supply power; setting up a short range communication channel to a communicator of the power receiver using a short range communication system, the short range communication channel having a range not exceeding 3 meters; transmitting a power restore message to the power receiver over the short range communication channel in response to detecting the restoring of the supply power; detecting a power receiver user action; initiating a power transfer to the power receiver after power restoration in response to the detection of the user action and inhibiting initiation of the power transfer after power restoration if the user action is not detected; and the power receiver performing the steps of: the communicator communicating with the power transmitter over the short range communication channel; and generating a user alert in response to the second communicator receiving the power restore message.

BRIEF DESCRIPTION OF THE DRAWINGS

Embodiments of the invention will be described, by way of example only, with reference to the drawings, in which.

DETAILED DESCRIPTION OF THE EMBODIMENTS

The following description focuses on embodiments of the invention applicable to a wireless power transfer system utilizing a power transfer approach such as known from the Qi Specification or the Ki Specification. However, it will be appreciated that the invention is not limited to this application but may be applied to many other wireless power transfer systems.

Figure 1:
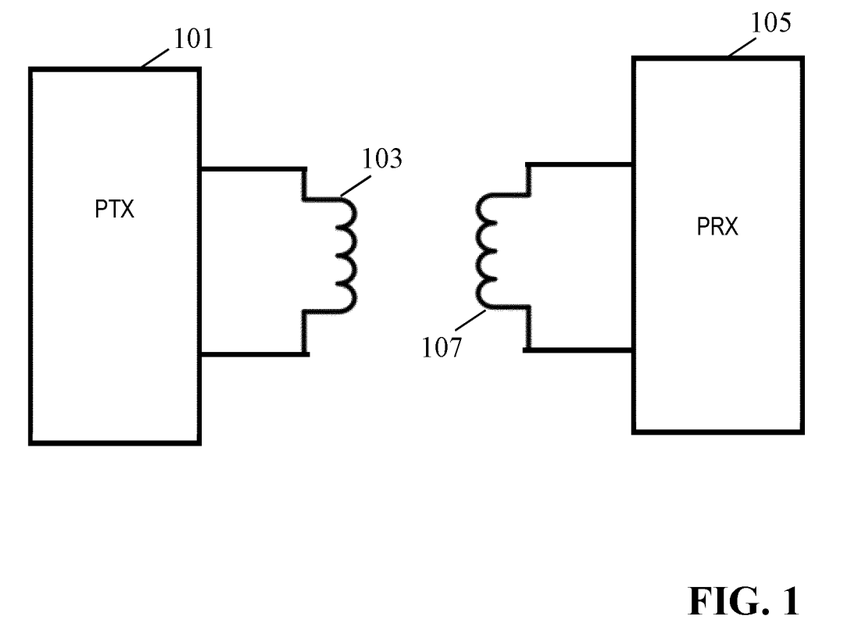
FIG. 1 illustrates an example of elements of a power transfer system in accordance with some embodiments of the invention.

FIG. 1 illustrates an example of a power transfer system in accordance with some embodiments of the invention. The power transfer system comprises a power transmitter 101 which includes (or is coupled to) a transmitter coil/inductor 103. The system further comprises a power receiver 105 which includes (or is coupled to) a receiver coil/inductor 107.

The system provides an inductive electromagnetic power transfer signal which may inductively transfer power from the power transmitter 101 to the power receiver 105. Specifically, the power transmitter 101 generates an electromagnetic signal, which is propagated as a magnetic flux by the transmitter coil or inductor 103. The power transfer signal may typically have a frequency between around 20 kHz to around 500 kHz, and often for Qi compatible systems typically in the range from 95 kHz to 205 kHz or for Ki compatible systems typically in the range between 20 kHz to 80 kHz. The transmitter coil 103 and the power receiving coil 107 are loosely coupled and thus the power receiving coil 107 picks up (at least part of) the power transfer signal from the power transmitter 101. Thus, the power is transferred from the power transmitter 101 to the power receiver 105 via a wireless inductive coupling from the transmitter coil 103 to the power receiving coil 107. The term power transfer signal is mainly used to refer to the inductive signal/magnetic field between the transmitter coil 103 and the power receiving coil 107 (the magnetic flux signal), but it will be appreciated that by equivalence it may also be considered and used as a reference to an electrical signal provided to the transmitter coil 103 or picked up by the power receiving coil 107.

In the example, the power receiver 105 is specifically a power receiver that receives power via the receiver coil 107. However, in other embodiments, the power receiver 105 may comprise a metallic element, such as a metallic heating element, in which case the power transfer signal directly induces eddy currents resulting in a direct heating of the element.

The system is arranged to transfer substantial power levels, and specifically the power transmitter may support power levels in excess of 500 mW, 1 W, 5 W, 50 W, 100 W or 500 W in many embodiments. For example, for Qi corresponding applications, the power transfers may typically be in the 1-5 W power range for low power applications (the basic power profile), up to 15 W for Qi specification version 1.2, in the range up to 100 W for higher power applications such as power tools, laptops, drones, robots etc., and in excess of 100 W and up to more than 2000 W for very high power applications, such as e.g. for Ki kitchen applications.

In the following, the operation of the power transmitter 101 and the power receiver 105 will be described with specific reference to an embodiment generally in accordance with the Qi or Ki Specifications (except for the herein described (or consequential) modifications and enhancements) or suitable for the higher power kitchen specification being developed by the Wireless Power Consortium. In particular, the power transmitter 101 and the power receiver 105 may follow, or substantially be compatible with, elements of the Qi Specification version 1.0, 1.1 or 1.2 (except for the herein described (or consequential) modifications and enhancements).

For many wireless power transfer systems, and in particular high power systems such as Ki, utilize resonant power transfer where the transmitter coil 103 is part of a resonance circuit and typically the receiver coil 107 is also part of a resonance circuit. In many embodiments, the resonance circuits may be series resonance circuits and thus the transmitter coil 103 and the receiver coil 107 may be coupled in series with a corresponding resonance capacitor. The use of resonance circuits tends to provide a more efficient power transfer.

Normally, a wireless power transfer system employs a power control loop in order to steer the system towards the appropriate operating point. This power control loop changes the amount of power that is transmitted from the power transmitter to the power receiver. The received power (or voltage or current) can be measured and together with the setpoint power value, an error signal can be generated. The appliance sends this error signal to the power control function in the power transmitter to reduce the static error, ideally to zero.

Figure 2:
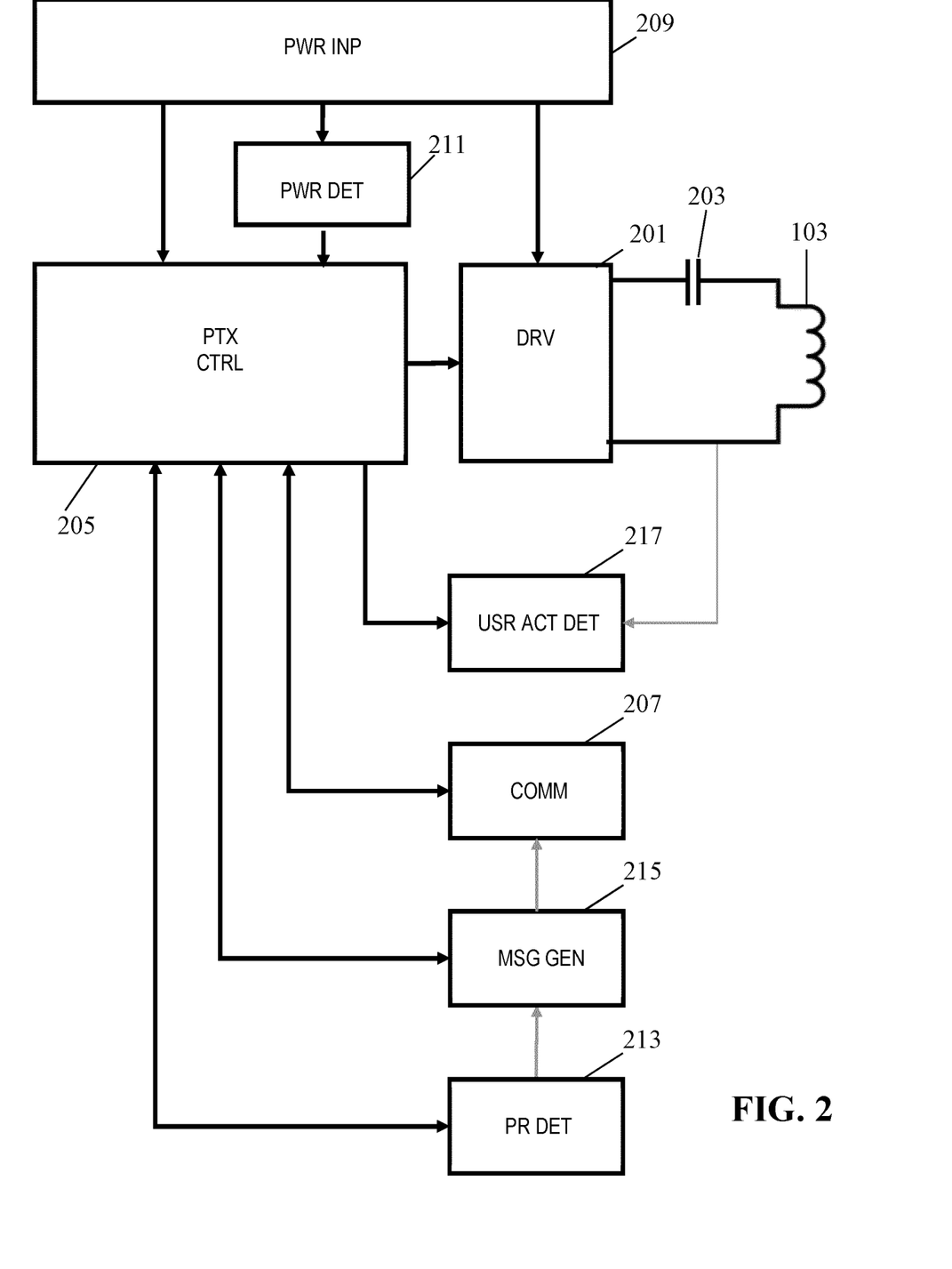
FIG. 2 illustrates an example of elements of a power transmitter in accordance with some embodiments of the invention.

FIG. 2 illustrates elements of the power transmitter 101 of FIG. 1 in more detail.

The power transmitter 101 includes a driver 201 which can generate a drive signal that is fed to the transmitter coil 103 which in return generates the electromagnetic power transfer signal thereby providing a power transfer to the power receiver 105. The transmitter coil 103 is part of an output resonance circuit which comprises the transmitter coil 103 and a capacitor 203. In the example, the output resonance circuit is a series resonance circuit, but it will be appreciated that in other embodiments, the output resonance circuit may be a parallel resonance circuit. It will be appreciated that any suitable resonance circuit may be used including one including multiple inductors and/or capacitors.

Figure 3:
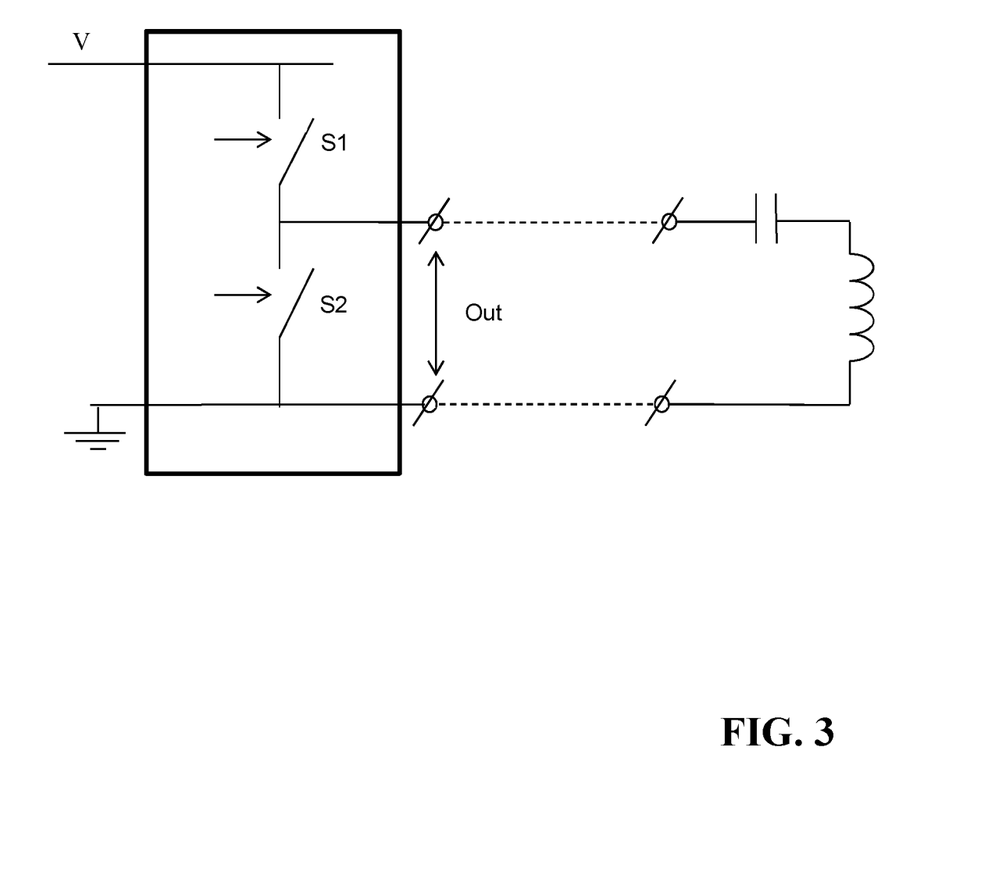
FIG. 3 illustrates an example of a half bridge inverter for a power transmitter.
Figure 4:
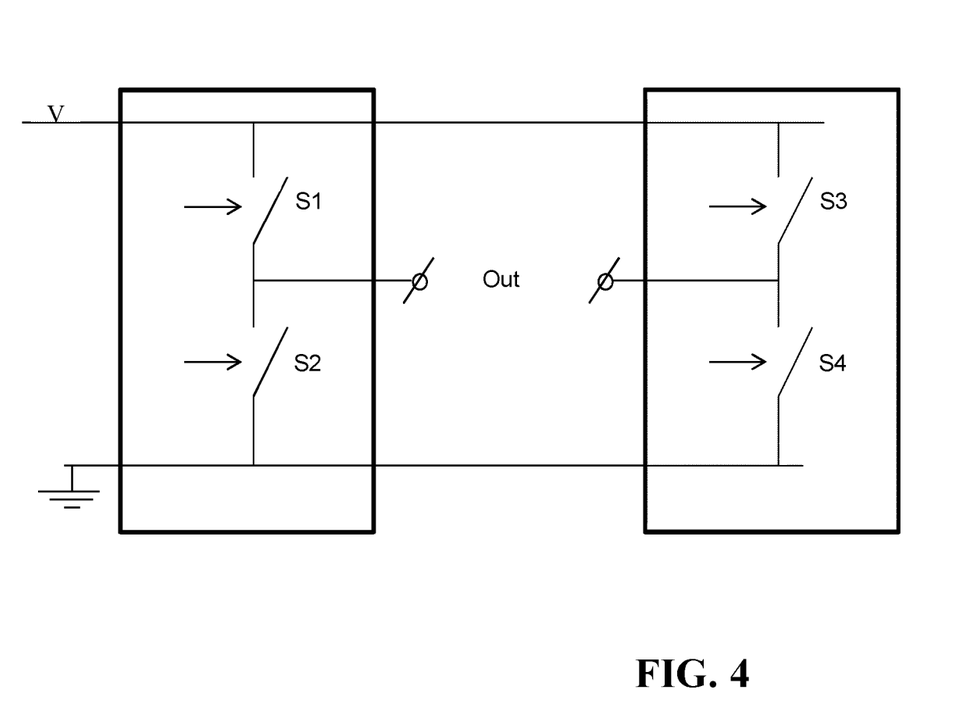
FIG. 4 illustrates an example of a full bridge inverter for a power transmitter.

The driver 201 generates the current and voltage which is fed to the output resonance circuit and thus to the transmitter coil 103. The driver 201 is typically a drive circuit in the form of an inverter which generates an alternating signal from a DC Voltage. The output of the driver 201 is typically a switch bridge generating the drive signal by the appropriate switching of switches of the switch bridge. FIG. 3 shows a half-bridge switch bridge/inverter. The switches S1 and S2 are controlled such that they are never closed at the same time. Alternatingly S1 is closed while S2 is open and S2 is closed while S1 is open. The switches are opened and closed with the desired frequency, thereby generating an alternating signal at the output. Typically, the output of the inverter is connected to the transmitter inductor via a resonance capacitor. FIG. 4 shows a full-bridge switch bridge/inverter. The switches S1 and S2 are controlled such that they are never closed at the same time. The switches S3 and S4 are controlled such that they are never closed at the same time. Alternatingly switches S1 and S4 are closed while S2 and S3 are open, and then S2 and S3 are closed while S1 and S4 or open, thereby creating a square-wave signal at the output. The switches are opened and closed with the desired frequency.

The power transmitter 101 further comprises a power transmitter controller 205 which is arranged to control the operation of the power transmitter 101 in accordance with the desired operating principles. Specifically, the power transmitter 101 may include many of the functionalities required to perform power control in accordance with the Qi Specification or the Ki Specification.

The power transmitter controller 205 is in particular arranged to control the generation of the drive signal by the driver 201, and it can specifically control the power level of the drive signal, and accordingly the level of the generated power transfer signal. The power transmitter controller 205 comprises a power loop controller controlling a power level of the power transfer signal in response to the power control messages received from the power receiver 105 during the power transfer phase.

The power transmitter 101 further comprises a first communicator 207 which is arranged to communicate with a complementary communicator of a power receiver. The first communicator 207 is arranged to set up a short range communication channel with the complementary communicator. A short range communication channel may for example be a communication channel having a range that does not exceed 30 cm, 50 cm, 1 m, 2 m, or 3 m depending on the preferences and requirements of the individual embodiment. The short range communication channel may be a communication channel that does not use the power transfer signal as a communication carrier and the first communicator 207 may be a separate short range communicator that does not utilize the power transfer signal for communication. Specifically, the first communicator 207 may be arranged to communicate in accordance with a separate short range communication standard, such as specifically a Near Field Communication (NFC) channel. Thus, the first communicator 207 may be an NFC communicator. It will be appreciated that in other embodiments, other means of short range communication may be used.

The power transmitter is arranged to be powered from an external power supply and comprises a power input 209 which is arranged to receive supply power from an external power supply.

The power input 209 may in some embodiments be a simple mechanical or electrical circuit that allows power to be received and distributed to the circuits of the power transmitter, such as an input connector, wires, PCB tracks etc providing power to the driver 201, power transmitter controller 205, etc. In some embodiments, the power input 209 may comprise circuitry for modifying or processing the provided power signal. For example, the power input 209 may be arranged to be coupled to the mains power and to generate one or more modified voltages from the mains, such as lower voltages, rectified and smoothed voltages (e.g. 5V for processes), as well as e.g. AC or varying DC voltages, such as a rectified but not smoothed 20V peak voltage for the inverter output.

Figure 5:
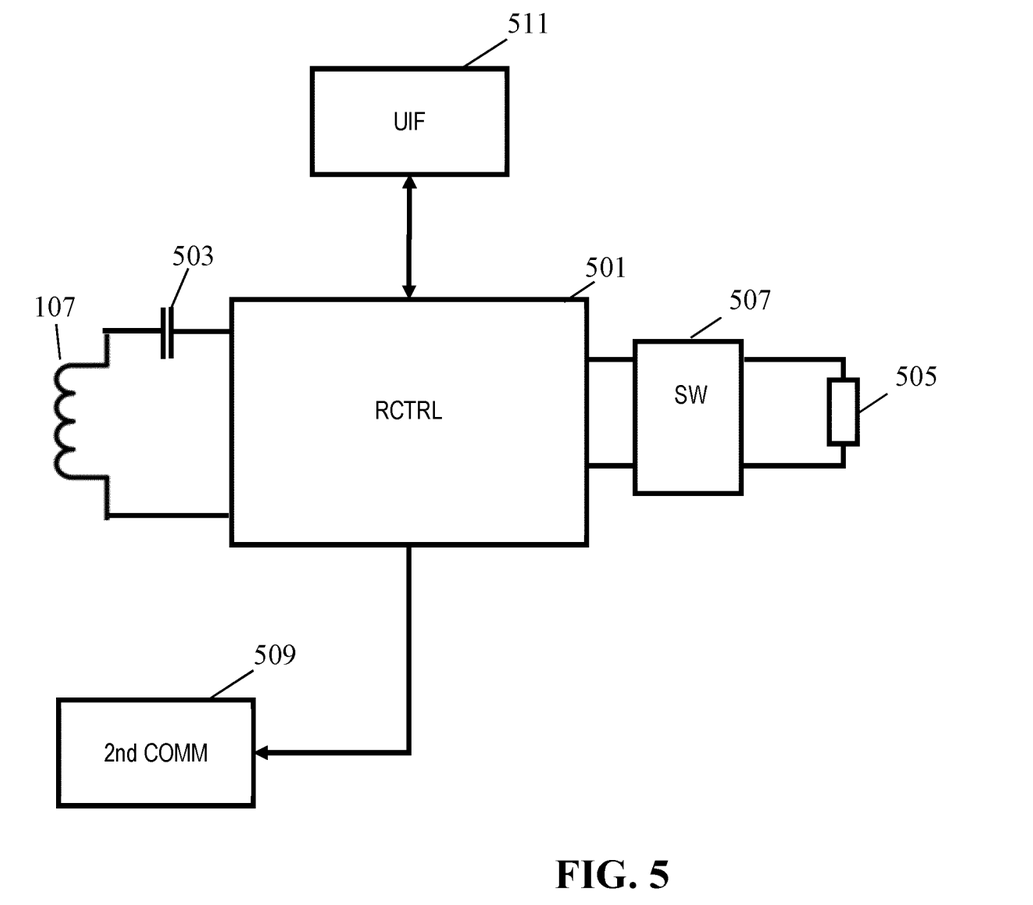
FIG. 5 illustrates an example of elements of a power receiver in accordance with some embodiments of the invention.

FIG. 5 illustrates some exemplary elements of the power receiver 105.

In the example, the receiver coil 107 is coupled to a power receiver controller 501 via a capacitor 503 which together with the receiver coil 107 forms an input resonance circuit. Thus, the power transfer may be a resonant power transfer between resonance circuits. In other embodiments, only one, or none, of the power receiver and the power transmitter may utilize a resonance circuit for power transfer.

The power receiver controller 501 couples the receiver coil 107 to a load 505 via a switch 507. The power receiver controller 501 includes a power control path which converts the power extracted by the receiver coil 107 into a suitable supply for the load 505. In some embodiments, the power receiver controller 501 may provide a direct power path which simply connects the input resonance circuit to the switch 507 or load 505, i.e. the power path of the power receiver controller 501 may simply be implemented by two wires. In other embodiments, the power path may include e.g. rectifiers and possibly smoothing capacitors to provide a DC voltage. In yet other embodiments, the power path may include more complex functions, such as e.g. voltage control circuitry, impedance matching circuitry, current control circuitry etc. Similarly, it will be appreciated that the switch 507 may only be present in some embodiments and that in some embodiments the load 505 may permanently be coupled to the input resonance circuit.

In addition, the power receiver controller 501 may include various power receiver controller functionality required to perform power transfer, and in particular functions required to perform power transfer in accordance with the Qi or Ki Specifications.

The power receiver controller 501 further comprises a second communicator 509 which is arranged to communicate data with the power transmitter. The second communicator 509 is the complementary communicator to the first communicator 207 and is arranged to establish the short range communication channel with the first communicator 207. The second communicator 509 may specifically be an NFC communication unit/device supporting communication over an NFC communication channel.

The second communicator 509 is specifically arranged to receive data transmitted by the first communicator 207 over the short range communication channel. In most embodiments, the second communicator 509 will also be arranged to transmit data to the first communicator 207. In some embodiments, communication between the power transmitter and power receiver may also be possible via a second, typically parallel, communication channel which specifically may be supported by the power transfer signal. For example, the power receiver may load modulate the power transfer signal or the power transmitter may modulate the power transfer signal directly.

In operation, the system is arranged to control the drive signal such that the power transfer signal attains suitable operating parameters/properties and such that the power transfer operates at a suitable operating point. In order to do so, the power transmitter is arranged to control a parameter of the drive signal using a power control loop where a power property of the power transfer signal/drive signal is controlled in response to power control error messages that are received from the power receiver.

At regular, and typically frequent, intervals, the power receiver transmits a power control error message to the power transmitter. In some embodiments, a direct power setpoint change message may be transmitted indicating a desired absolute power level (rather than a relative error message). The power receiver 105 comprises functionality for supporting such a power control loop, e.g. the power receiver controller 501 may continuously monitor the power or voltage of a load signal provided to the load and detect whether this is above or below a desired value. It may at regular intervals generate a power control error message which requests that the power level of the power transfer signal is increased or decreased, and it may transmit this power control error message to the power transmitter.

Typically in wireless power transfer systems, the power transmitter is arranged to initiate and provide power transfer when a power receiver is detected to be present. The power transmitter is typically continuously powered and will continuously monitor for the presence of a power receiver. If a power receiver is detected to be present, the power transmitter will initiate a power transfer and generate the power transfer signal. However, whereas such operation may be advantageous and suitable for many applications and uses, such as for example for continuous charging of devices, the Inventor has realized that it does not lead to optimum performance in all situations. In the following an approach will be described with reference to the power transmitter and power receiver of FIGS. 1, 2 and 5 which may provide improved performance, and which in particular may provide improved and/or more reliable operation for many power transfer systems, including for scenarios in which power disruptions in the supply power to the power transmitter may occur.

The power transmitter of FIG. 4 specifically further comprises a power detector 211 which is arranged to detect that arranged to detect when the supply power is restored following an outage of the supply power provided to the power transmitter. For example, the power transmitter may typically be arranged to be (semi)permanently coupled to the mains supply. E.g., for a kitchen application where the power transmitter is built into a kitchen work surface to provide power to any power receiver positioned appropriately on the work surface, the power transmitter is typically permanently connected to the mains network such that it is capable of powering a power receiver whenever needed. In such a system, power may thus be provided to a power receiver and power transfer may be initiated whenever a new power receiver is positioned appropriately. However, even for power transmitters that are permanently coupled to a suitable power supply, it is possible for power disruptions/outages to occur. For example, for a mains network, power outages may occur due to faults developing in the system. Although electricity providers will tend to try to minimize the duration of such outages, they tend to have a varying and unknown duration, and outages may in practice be very short, such as e.g. just a few seconds or even less, or may be very long, such as several hours or even more.

The power detector 211 may detect that power is restored following a power outage. In some embodiments, the power detector 211 may simply detect that a power up process is ongoing and for example the power detector 211 may be implemented as part of a start-up/boot process of a processor that implements functionality of the power transmitter. In other embodiments, the power detector 211 may for example include a dedicated power detector circuit which e.g. measures a voltage over a smoothing capacitor that smoothes a rectified input voltage. In some embodiments, a more complex criterion may be used for detecting that a power restore operation is performed such as e.g. including a consideration of a temporal aspect of a property of the input supply power, such as e.g. a consideration of a duration of the power outage, of the input voltage variation as a function of time, a minimum input power/voltage during the outage etc.

The power transmitter further comprises a presence/proximity detector 213 arranged to detect a presence of the power receiver at restoring of the supply power. Thus, when power is being (or has been) restored, the presence detector 213 is arranged to determine whether a power receiver is present/proximal. The presence detector 213 may specifically detect if a power receiver is present in a suitable configuration for power transfer from the power transmitter to the power receiver to be performed.

It will be appreciated that different techniques are known for detecting the presence of a power receiver by a power transmitter and that any suitable approach may be used. For example, in some embodiments, the presence detector 213 may generate a short ping signal from the transmitter coil 103 and may detect whether the power extracted from the ping signal exceeds a given threshold. Such power extraction is likely to be caused by metal being present in the environment indicating that an object (likely to be a power receiver) is present, or may be caused directly by a power receiver extracting induced power from the electromagnetic field. In other embodiments, other approaches may be used, including e.g. the presence detector 213 comprising a mechanical sensor for detecting if an object is positioned on the work surface.

The power transmitter further comprises a message generator 215 which is arranged to transmit a power restore message to the second communicator over the short range communication channel in response to the power detector 211 detecting the restoring of the supply power. In the power transmitter, the detection of input power being restored by the power detector 211 is thus fed to the message generator 215 which in response proceeds to transmit a message to the power receiver. The message is a power restore message which is indicative of an input power restoration having been detected.

In some embodiments, the message generator 215 may be arranged to transmit the power restore message when a restoration of power has been detected and regardless of whether the power receiver has been detected or not. However, in some embodiments the message circuit is arranged to transmit the power restore message to the second communicator over the short range communication channel only if the presence detector 213 has detected the presence of the power receiver. Thus, in some embodiments, the message generator 215 may in some embodiments be arranged to only transmit the power restore message if both a power restoration situation is detected and the presence of the power receiver is detected.

The power transmitter further comprises a user action detector 217 arranged to detect a power receiver user action. The user action detector 217 is arranged to detect that a user action has been applied to the power receiver. In some embodiments, the user action detector 217 may be arranged to directly detect an action being applied to the power receiver e.g. by itself sensing or detecting a movement or change of the power receiver. In other embodiments, the user action detector 217 may detect the user action in response to receiving a notification or message that a user action has been applied to the power receiver, such as for example by receiving a message directly from the power receiver indicating that a user action has been detected. It will be appreciated that the exact criterion used by the user action detector 217 to determine that a user action has been detected may depend on the preferences and requirements of the individual embodiment. For example, in some embodiments, the criterion may simply be that a message is received from the power receiver indicating that a user action has been detected. For example, the user action detector 217 may comprise a list of user actions that the user action detector 217 is seeking to detect and a criterion for each. This may for example include a list of specific messages which when received from the power receiver are determined to be a detection of a corresponding user action.

In the power transmitter, the power transmitter controller 205 is arranged to initiate a power transfer to the power receiver after power restoration in response to the detection of the user action, and to inhibit initiation of the power transfer after power restoration if the user action is not detected. The restoration of supply power to the power transmitter does for the power transmitter not directly result in wireless power transfer being (re)started when power is restored, but rather power transfer is conditional on the detection of a user action. The wireless power transfer is not automatic upon input power restoration even if the power receiver is positioned suitably for power transfer but rather power is inhibited unless a suitable user action meeting the criterion employed by the user action detector 217 is detected.

This functionality is further combined with the active interaction between the power transmitter and the power receiver whereby the power transmitter actively transmits a power restore message to the power receiver indicating that a power restore operation is being performed. The power receiver receives this power restore message over the short range communication channel supported by the second communicator 509 and in response to receiving the message it is arranged to generate a user alert. The user alert may provide an indication to the user that a power transfer has been interrupted and will only be restarted if the user performs an appropriate action.

The power receiver specifically comprises a user interface 511 which in response to the second communicator receiving the power restore message may generate the user alert. The user interface 511 may for example include a visual and/or audio user interface which can be used to generate the user alert. For example, in some embodiments, the user interface 511 may include a light which is turned on when the power restore message is received. As another example, the user interface 511 may comprise a buzzer or loudspeaker arranged to generate an audio alarm that may indicate to the user that power has been interrupted and is being restored. In other embodiments, the user interface 511 may include more complex user outputs, such as e.g. a display on which a specific message may be presented, e.g. stating that a power disruption has occurred and that a given user action may have to be performed in order to restart power transfer. As another example, the user interface 511 may be arranged to render synthesized or recorded speech to the user, e.g. stating that a given user action must be performed to restart power transfer.

The described approach may in many scenarios provide improved operation and an advantageous user experience/control. It may in many scenarios provide a more reliable operation and function.

In contrast to approaches where the presence of a power receiver causes the power transmitter to initiate a power transfer, the Inventor has realized that improved performance may be achieved by the described approach where particular attention is given to a modified operation when power restoration occurs after a power disruption. For example, the Inventor has realized that in many usage scenarios, such as for many kitchen applications, power receivers may be positioned at possible power transfer locations for a long time and that they may be positioned at such locations without desiring to be powered. In such a case, a power outage may result in a re-initialization upon power restoration that may result in power transfer being initiated to a power receiver that is not desiring power. Indeed, in many scenarios, a power outage may be only last a few seconds or could last for several hours, and upon power restoration, whether a power transfer is desirable or not may depend on how long the outage has lasted for. As a specific example, a blended may be positioned on a kitchen worktop surface such that it is powered by a power transmitter embedded in the worktop. It may be operated at a time when a power outage occurs. If the power outage is very short, it may be desirable for power transfer to take place with minimum effort by the user, i.e. it may be desirable to continue the blending. However, if the power outage lasts for longer, and possibly several hours, it will be highly undesirable for the power receiver to be powered and the blender starting the blending automatically.

The described approach may provide a more robust operation in view of power outages and disruptions and may provide improved user control. The approach may allow easy power transfer restarting by the user while still ensuring that undesired power transfer does not automatically take place after a power outage. A particular advantage of the approach is that it can be implemented without requiring the power transmitter or indeed the power receiver to necessarily maintain any information or depend on the operation or any parameters prior to the power outage, or without having any information of the power outage (such as a duration). Thus, the approach may avoid any requirement for storage or back-up power at either the power transmitter or the power receiver (or indeed both).

Further, the approach is based on interworking between the power transmitter and the power receiver using communication over a short range communication channel. This may provide improved performance and reliability and in particular may reduce risk of e.g. the power transmitter interworking with a different power receiver that may be positioned further away. In particular, by using a suitable short range communication channel, it may be achieved that the communication effectively can (substantially) only be from a power receiver that is positioned such that power transfer to that power receiver is feasible (and that communication cannot be received from e.g. a power receiver powered by a different power transmitter or transmitter coil).

In some embodiments, the power receiver may be arranged to detect a user action being performed and may in response transmit a user action message to the power transmitter. The user action message may be indicative of a user action (meeting a criterion) being detected by the power receiver.

The second communicator 509 may be arranged to transmit the user action message to the power transmitter in response to the power receiver detecting that a user action meets a criterion. The user action message may in some embodiments be a message that directly indicates a given user action, i.e. a dedicated user action message for a given user action may be transmitted. In other embodiments, the user action message may for example be a message that may be transmitted in response to a detection of a variety of user actions and the user action message may indicate what user action has been detected. In some embodiments, the user action message may comprise data for other purposes, such as functional data indicating measured or desired parameter values. For example, the user action message may comprise an indication of a desired power profile for a power transfer. The user action message is a message that informs the power transmitter that the power receiver has detected a user action which meets a criterion (the exact criterion may depend on the specific requirements for the individual embodiment).

Specifically, in some embodiments, the user interface may comprise a user input such as a button or other feature that can be manipulated by the user. At power restoration, the power transmitter proceeds to inhibit initiation of a power transfer such that the power transfer operation does not start automatically. Further, it transmits a power restore message to the power receiver. The power receiver receives the power restore message from the power transmitter and in response it proceeds to generate a user alert. This may alert the user to the fact that power transfer can be (re)started by the user performing a suitable action. In many cases, the user may not be aware that a power outage has occurred, and the user alert may accordingly also in cases where a power transfer is believed to be ongoing alert the user to the fact that this power transfer operation has indeed been disrupted. In response to the user alert, the user may provide a suitable user input, such as by pressing e.g. a dedicated power transfer start button. The power receiver may detect the user input, i.e. that the button has been pressed in the specific example, and may in response proceed to generate and transmit a user action message to the power transmitter. When receiving this user action message (and possibly after verifying that the message meets a suitable criterion), the power transmitter may proceed to initiate the power transfer.

The power transmitter and power receiver may accordingly interoperate to ensure that power transfer only occurs when appropriate.

In some embodiments, the power transmitter may be arranged to itself detect a user action being applied to the power receiver. Thus, in some embodiments, the power transmitter may itself detect the user action without relying on detection functionality in the power receiver and without requiring the power receiver to transmit a user action message to the power transmitter.

Specifically, the user action detector 217 may be arranged to detect a movement (translation/rotation) of the power receiver and to determine that a user action is detected in response to the movement meeting a criterion.

The movement may for example be detected optically. For example, the power transmitter may include a camera input receiving an image/video signal from a camera that views the area where a power receiver is positioned for power transfer. The user action detector 217 may include object detection and may be able to determine movement based on the object detection. The power receiver may for example comprise optical characteristics, such as specific patterns, that may be easy to detect in an image. The movement may be represented by the movement of the corresponding object/pattern and if the movement in the image meets a given criterion, it may be considered to be detected that a user action has occurred. For example, the user may in order to start the power transfer proceed to rotate the power receiver by a substantial amount followed by a rotation back to the original position. Such a rotation can be detected in the image and if a motion in the image corresponding to a rotation is detected by the user action detector 217, an appropriate user action may be considered to be detected and power transfer may be initiated.

As an example, the images from the camera may be analyzed to detect a rotation of the power receiver, or e.g. a lifting of the power receiver etc. In some such cases, the power receiver may e.g. be designed to facilitate reliable detection, such as e.g. by having a surface pattern which is easy to extract from background textures and for which rotations are easily detected.

As another example, in some embodiments, the user may be required to press a button on the power receiver which may result in a light (e.g. a LED) being switched on and lighting up on the power receiver. The power transmitter may be implemented with a light sensor that is aimed at the expected position of the light. If the light sensor detects sufficient light, a detection of the user action be considered to be detected.

In some embodiments, the user action detector 217 is arranged to detect the user action by detecting a sequence of an absence of the second communicator followed by a presence of the second communicator. The user action detector 217 may for example continuously receive data from the presence detector 215 indicating whether a power receiver is detected in the environment or not, and may detect if the power receiver is removed and then replaced on the power transmitter by considering that such an operation would correspond to a detection of a sequence of the power receiver first being present during power restoration, then no power receiver being present, followed by a detection of a power receiver being present. Such a sequence may be considered to be a detection of a suitable user action.

If no power receiver is present when the power is being restored, the power transmitter will not initiate any power transfer as there is no power receiver to which to provide power. However, if the presence detector 215 indicates that a power receiver is present when power restoration occurs, the power transmitter controller 205 may still inhibit the setting up of a new power transfer to the power receiver. Thus, even if a power receiver is present, no power transfer occurs. However, if a sequence of no power receiver being present followed by a power receiver being present is detected, it is considered that this is caused by a user action being applied to the power receiver, and specifically to the user moving the power receiver from the power transmitter and putting it back on the power transmitter in order to start the power transfer. Thus, in such an example, a power transfer is not automatically started but requires the user to perform an action of removing and replacing the power receiver in order to start or restart the power transfer.

In some embodiments, the user action detector 217 may for example further include a temporal requirement such as that the sequence must be performed within a given time interval or within a given duration. For example, the user action may only be considered to be detected if the sequence indicates that the user has performed a relatively quick action of removing and placing the power receiver. This may for example differentiate to other situations, such as for example if a user removes the power receiver as it is not desired for this to be powered and then replaces it with another power receiver. However, in many embodiments, it is desirable for the power transfer to be initiated for any power receiver being positioned at the power transmitter after a detection of no power receiver being present, and therefore the power transmitter may proceed to initiate power transfer whenever a new power receiver is detected to be present.

As previously mentioned, the exact algorithm and approach used by the presence detector 215 for detection of the presence of the power receiver may depend on the preferences and requirements of the individual embodiment.

In many embodiments, the presence detector 215 may advantageously be combined with the communication function and the presence detector 215 and first communicator 207 may be combined. In particular, the presence detection by the presence detector 215 of the power receiver may be in response to a detection by the first communicator of a presence of the second communicator.

As an example, in some embodiments, the first communicator 207 may detect that the second communicator 509 is present in response to the second communicator 509 responding to a query message transmitted over the short range communication channel. If communication is feasible over the short range communication channel, there must be a power receiver present within the range of the short range communication channel. Accordingly, the first communicator 207 may at frequent intervals transmit a query message and consider the presence of the power receiver to be detected if a response message is received from the power receiver. The second communicator 509 may be arranged to respond to a query message received from the power transmitter. Thus, the presence detection may be implemented by the power transmitter implementing a polling procedure.

In some embodiments, the first communicator 207 may be arranged to detect the presence of the second communicator in response to detecting a power being extracted from an electromagnetic carrier signal generated by the first communicator exceeding a threshold.

The first communicator 207 may specifically comprise an antenna which may typically be in the form of a coil. The communication over the short range communication system may typically be by the first communicator 207 generating an electromagnetic carrier signal by driving the antenna/coil by a suitable high frequency drive signal. The carrier signal may be modulated and typically transmission of data from the first communicator 207 to the second communicator 509 may be by modulating phase, frequency, and/or amplitude of the carrier signal whereas the transmission of data from the second communicator 509 to the first communicator 207 may be by load modulation of the carrier signal by the second communicator 509.

The first communicator 207 may be arranged to detect the power level being extracted from the carrier signal, and often may detect e.g. the current or power of the drive signal driving the antenna/coil. If a power receiver is present, the power extracted from the carrier signal, and thus provided to the coil by the drive signal, is higher than if the power receiver is not present as the power receiver may extract power in many embodiments. In some embodiments, the power receiver presence detection may thus be based on a criterion that includes a requirement for a presence to be detected that the power level is above a threshold.

In particular, in many embodiments, the communication between the first communicator 207 and the second communicator 509 may be via a transmitter coil (of the first communicator 207) and a receiver coil (of the second communicator 509) that are loosely coupled. In such an embodiment, the loading of the receiver coil by a load extracting power from the receiver coil can be detected at the power transmitter end as the extracted power must be provided to the transmitter coil. Accordingly, in many embodiments, the presence detection for the power receiver is in response to a detection of the power extracted from a carrier signal. The first communicator 207 may be arranged to generate the carrier signal whenever it is desired to perform a presence detection regardless of whether communication is performed or not. Indeed, in some embodiments, the carrier signal may be generated continuously in order to allow continuous presence detection. In other embodiments, the carrier signal may e.g. be generated periodically for periodic presence detections.

In some embodiments, the second communicator 509 may be arranged to extract power from the electromagnetic carrier signal generated by the first communicator 207 and to use (at least some of) the extracted power as supply power for at least part of the circuitry of the second communicator 509. Specifically, when power restoring occurs and before any power transfer is initialized, the second communicator 509 may be arranged to extract power from the signal carrier and to use this power for powering the communication functionality. Accordingly, the power transmitter may power up the communication functionality of the power receiver even if it is not providing a full power transfer to the power receiver. The extracted power may further be used to supply other functionality of the power receiver such as any power required for acting on a power restore message received from the power transmitter. The extracted power may specifically be used to supply the necessary parts of the power receiver controller 501 and the user interface 511 in order to generate the user alert. In this way, the power receiver may be able to support the conditional power transfer initialization procedure without requiring any other power source, and specifically without having any internal power source (such as a battery).

Figure 6:
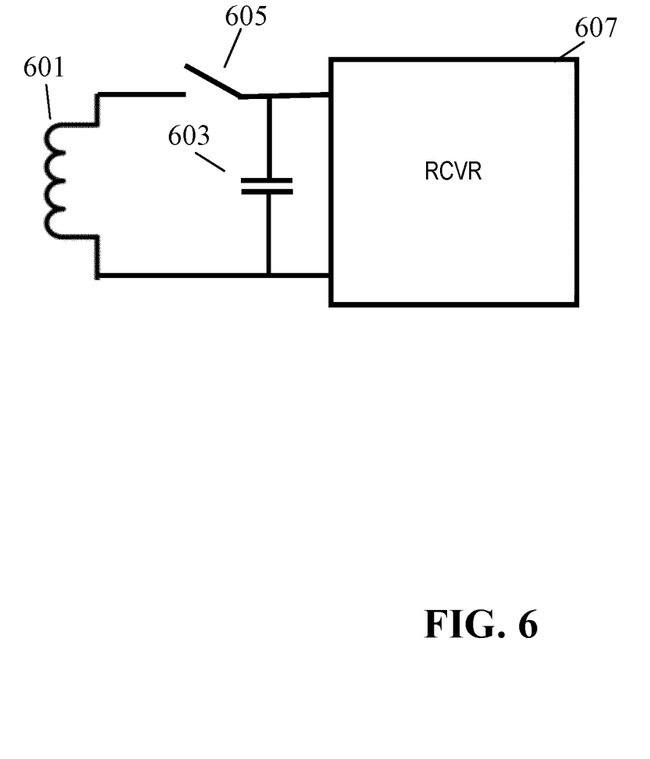
FIG. 6 illustrates an example of elements of a power receiver in accordance with some embodiments of the invention.

In some embodiments, the power receiver controller 501 may be arranged to initiate/perform a sequence of disconnecting the power receiver communication coil from a load followed by connecting the power receiver communication coil to the load in response to a user input meeting a criterion. FIG. 6 may illustrate some elements of the second communicator 509. The second communicator 509 comprises a power receiver communication coil 601 which may couple to the complementary power transmitter communication coil of the first communicator 207 in order to establish the short range communication channel. In the example, the power receiver communication coil 601 is coupled to a parallel capacitor 603 via a switch 605. The power receiver communication coil 601 is further coupled to the remaining power receiver circuitry 607 which may include receiver functionality, power extraction functionality, load modulation functionality etc.

During normal operation, the switch 605 is closed and the power receiver communication coil 601 and the capacitor 603 form a resonance circuit that couples to a corresponding resonance circuit in the first communicator 207. The communication channel is formed by this loose coupling between the communication coils. When the switch is closed, the power receiver communication coil 601 is further loaded by the power receiver circuitry 607 and thus the power receiver communication coil 601 is typically and during communication loaded by the capacitor 603 (thus forming a resonance circuit) and the power receiver circuitry 607 (thus damping the resonance circuit). However, the switch 605 allows the power receiver communication coil 601 to be disconnected and decoupled from this loading. Indeed, when the switch is opened, no current flows through the power receiver communication coil 601 and no power is extracted by the second communicator 509 from a communication carrier generated by the first communicator 207.

In some embodiments, the power receiver controller 501 is arranged to detect that a suitable user input is received indicating that power transfer is desired to be performed by the user. For example, it may simply detect that a suitable button has been pressed. In response to the detection of a user input, the power receiver controller 501 may proceed to control the second communicator 509 to perform the sequence of disconnecting the power receiver communication coil 601 from a load followed by connecting the second communication coil to the load. Specifically, the power receiver controller 501 may control the switch 605 to disconnect the capacitor 603 and the power receiver circuitry 607 followed by switching the switch 605 back to the closed position to again connect the capacitor 603 and the power receiver circuitry 607 to the coil.

Such a process may by the first communicator 207/power transmitter be seen as a sequence of the second communicator 509 being present during power restoration, followed by the second communicator 509 not being present (when the switch 605 is open so no power is extracted), followed by the second communicator 509 again being present (the switch being closed so power is extracted from the carrier signal).

The approach may thus allow the power receiver to emulate the effect caused by removing the power receiver and replacing it on the power transmitter. Accordingly, the power transmitter may consider the approach to be indicative of a suitable user action and it may proceed to initialize a power transfer.

As an example of the described approach, the power transmitter may be arranged to detect that a power supply is restored after an outage. If a suitable power receiver is present in the operating volume, the power transmitter may make this aware of the power restoration/disruption and a user alert may be generated to request the user to perform an action in order for the wireless power transfer to be resumed. The power transmitter may monitor for an indication that this user action is performed, and if so, it may proceed to initialize a power transfer. However, until the user action is detected, no power transfer is initiated/performed.

As an example, the system may perform the following steps upon power restoration:

1. The power transmitter detects the mains power is present/being restored.
2. The power transmitter performs a search for a power receiver in the operation volume.
3. If a power receiver is detected, the power transmitter establishes the communication with it.
4. The power transmitter and power receiver may negotiate and regulate an auxiliary power to be delivered via a communication carrier signal.
5. The power transmitter provides a power restore message indicating that power is being restored and that a power restoration has occurred.
6. The power receiver generates a user alert indicating that power is being restored and that a power disruption has occurred. The user alert indicates to the user that a user action is required in order to continue/initiate a power transfer.
7. The user action is detected by the power transmitter which then proceeds to initiate power transfer.

In some embodiments, the system may be arranged to adapt operation based on temporal considerations.

In particular, in some embodiments, the operation of the power receiver may be dependent on a duration of the power interruption of the power transfer, and thus the operation of the power receiver when receiving the power restore message may depend on the duration/time lapsed since a disruption to the power transfer signal occurred.

In some embodiments, the power receiver may determine the duration since a disruption of the power transfer signal occurred. For example, the power receiver may continuously measure that a voltage is induced in the receiver coil 107. If, during power transfer, it is detected that no signal is induced (or e.g. that this is below a given threshold) in the receiver coil 107, e.g. by detecting that a voltage over or current through the receiver coil 107 falls below a threshold, the power receiver may start a timer or store a current time (e.g. the power receiver may comprise a clock or have access to time information). This may for example be performed during a time in which the power receiver may be partly powered by an internal energy reservoir, such as a smoothing capacitor. If the interruption is sufficiently long, the energy reservoir may be completely depleted, and the power receiver may be completely switched off. However, if e.g. the time of disruption was stored in non-volatile memory, the information would be retained even if no power is available to the power receiver.

When the supply power is restored to the power transmitter and a power restore message is transmitted to the power receiver, the power receiver may determine a duration since the disruption of the power transfer signal. For example, the power receiver may retrieve the stored time and compare it to a current time. If the power receiver operates a timer that has remained powered throughout the duration of the interruption (e.g. by being powered by a small back-up battery that is however not capable of powering other circuitry of the power receiver), the time output may directly provide the duration since the disruption.

In such cases, the duration may be determined and compared to a threshold to determine if the duration exceeds a given time. In other embodiments, the comparison to a threshold may be more implicit. For example, if the duration is sufficiently short for the energy reservoir to only be partially depleted, the duration may be considered to be less than a threshold and otherwise it may be considered to be above. For example, when the power restore message is received, the functionality of the power receiver which is involved in the power restoration process may be powered by e.g. the communication carrier signal. This functionality may e.g. measure a current voltage of a smoothing capacitor of the power path of the power receiver and if the voltage is above a given threshold, it may be determined that the duration is less than a corresponding temporal threshold. If it is below the given threshold, it may be determined that the duration is less than a corresponding temporal threshold.

In some embodiments, the second communicator 509 may be arranged to automatically transmit a user action message to the first communicator 207 if the duration is considered to be sufficiently short. In some embodiments, the second communicator 509 may transmit the user action message without receiving/detecting a user input if the duration of power interruption of the power transfer signal prior to receiving the power restore message is less than a threshold. For example, when the second communicator 509 receives the power restore message, it may proceed to evaluate if the time since the disruption of the power transfer signal was detected. For example, when using a timer, the second communicator 509 may determine if the time indicates a duration above a threshold or not. If a smoothing capacitor is included, it may be determined if the voltage is above a given level or not.

If the duration is sufficiently short, the power receiver may proceed to transmit the user action message even if no user input is received, and thus the power transmitter may proceed to initialize power transfer without making this conditional on a user action.

In some embodiments, if the duration is shorter than a given threshold, the power receiver may not generate any user alert at all. Specifically, in some embodiments, the user interface 511 may be informed of, or itself determine, the duration of power interruption of the power transfer signal prior to receiving the power restore message. The user interface 511 may be arranged to only generate the user alert if the duration exceeds a threshold. If the duration is shorter than the threshold, no user alert is generated and thus the user is not informed of the power restoration (or disruption).

The approaches may advantageously be combined such that if the duration is sufficiently short, the power receiver does not generate a user alert but instead automatically transmits a user action message causing the power transmitter to resume power transfer. However, for longer power interruptions, the previously described approach may be used whereby a user action must be detected before a power transfer can be initiated.

The approach may provide improved performance/operation in many scenarios and may for example allow (possibly very) short power interruptions to automatically be recovered from without requiring specific user action. However, at the same time, for longer disruptions, a user action is necessary for power transfer thereby reducing the risk of an undesired power transfer to be performed.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. The inclusion of a feature in a dependent claim of one independent claim does not imply a limitation to this independent claim but rather indicates that the feature is equally applicable to other independent claims as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality. Reference signs in the claims are provided merely as a clarifying example shall not be construed as limiting the scope of the claims in any way.

The invention claimed is:

1. A power transmitter comprising:
   a power detector circuit, wherein the power detector circuit is arranged to detect a restoring of a supply power;
   a presence detector circuit, wherein the presence detector circuit is arranged to detect a presence of the power receiver when the supply power is restored;
   a first communicator circuit, wherein the first communicator circuit is arranged to configure a communication channel;
   a message circuit, wherein the message circuit is arranged to transmit a power restore message in response to detecting the restoring of the supply power;
   a user action detector circuit, wherein the user action detector circuit is arranged to detect a user action; and
   a controller circuit,
      wherein the message circuit is arranged to initiate a power transfer to the power receiver after power restoration in response to the detection of the user action,
   wherein the message circuit is arranged to inhibit initiation of the power transfer after power restoration if the user action is not detected,
   wherein the user action detector circuit is arranged to detect the user action in response to the first communicator circuit receiving a user action message,
   wherein a second communicator is arranged to transmit the user action message without receiving a user input if a duration of power interruption of a power transfer signal prior to receiving the power restore message is less than a threshold,
   wherein the first communicator circuit comprises a first communication coil,
   wherein a second communicator comprises a second communication coil,
   wherein the communication channel is formed by a coupling between the first communication coil and the second communication coil,
   wherein the controller circuit is arranged to initiate a sequence,
   wherein the sequence comprises disconnecting the second communication coil from a load followed by connecting the second communication coil to the load in response to the user input meeting a criterion.

2. The power transmitter of claim 1,
   wherein the detection of the user action comprises detecting a sequence,
   wherein the sequence comprises an absence of a second communicator followed by a presence of the second communicator.

3. The power transmitter of claim 1, wherein the presence detector circuit is arranged to detect the presence of a power receiver in response to a detection by the first communicator circuit of a presence of a second communicator.

4. The power transmitter of claim 3, wherein the first communicator circuit is arranged to detect the presence of the second communicator in response to detecting a power extracted from an electromagnetic carrier signal generated by the first communicator circuit exceeding a threshold.

5. The power transmitter of claim 1, wherein the communication channel is a Near Field Communication channel.

6. The power transmitter of claim 1, wherein a second communicator is arranged to extract power from an electromagnetic carrier signal generated by the first communicator circuit when power is restored prior to the establishment of power transfer.

7. The power transmitter of claim 1, where the message circuit is arranged to transmit the power restore message to a second communicator over the communication channel if the presence detector circuit has detected the presence of a power receiver.

8. The method of claim 1, further comprising detecting the presence of a power receiver in response to a detection by a first communicator circuit of a presence of a second communicator.

9. The method of claim 8, further comprising detecting the presence of the second communicator in response to detecting a power extracted from an electromagnetic carrier signal exceeding a threshold.

10. The method of claim 1, wherein a second communicator is arranged to extract power from an electromagnetic carrier signal when power is restored prior to the establishment of power transfer.

11. The method of claim 1, further comprising transmitting the power restore message to a second communicator if the presence detector circuit has detected the presence of a power receiver.

* * * * *